(No Model.) 2 Sheets—Sheet 1.
G. ILLSTON.
BICYCLE.
No. 245,071. Patented Aug. 2, 1881.
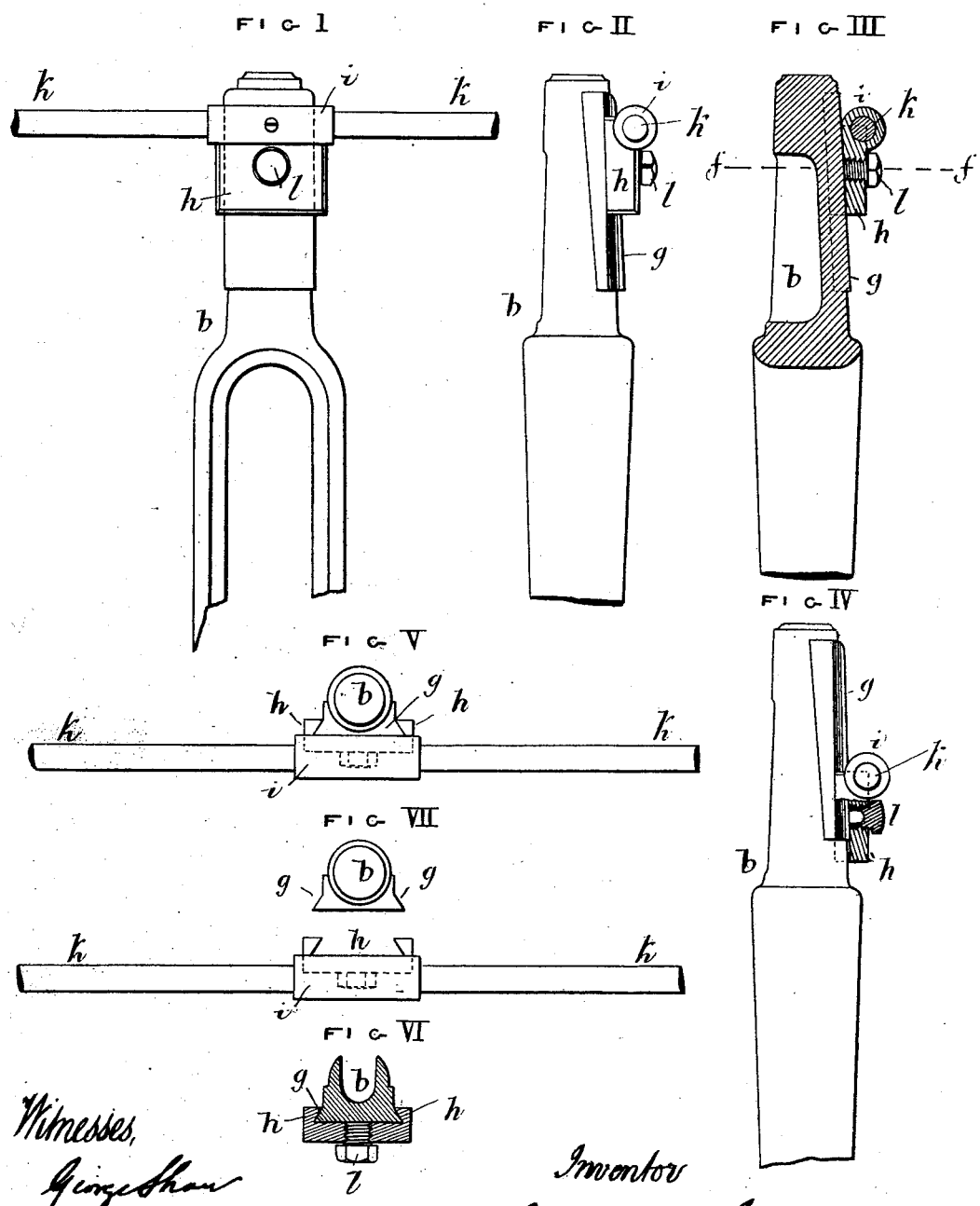

(No Model.) 2 Sheets—Sheet 2.
G. ILLSTON.
BICYCLE.
No. 245,071. Patented Aug. 2, 1881.
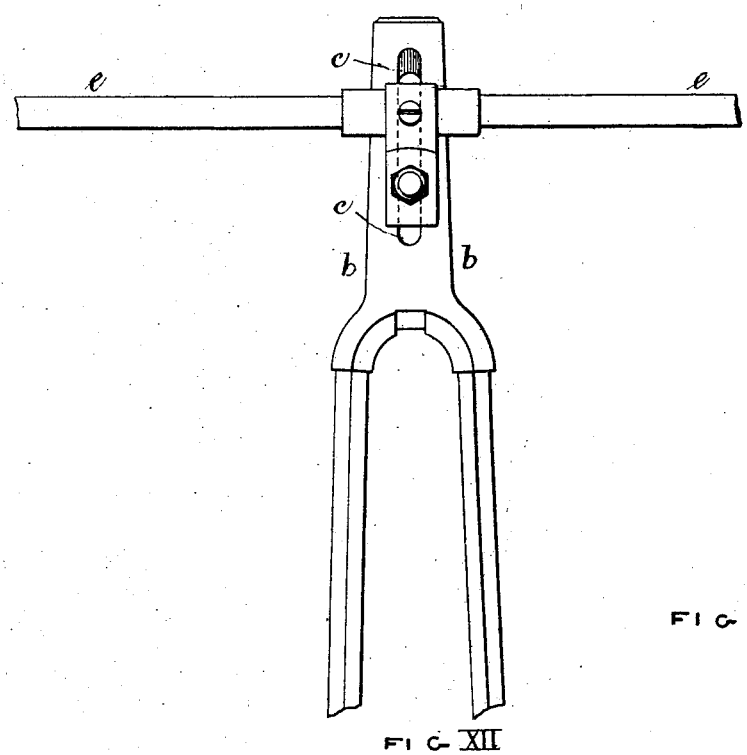
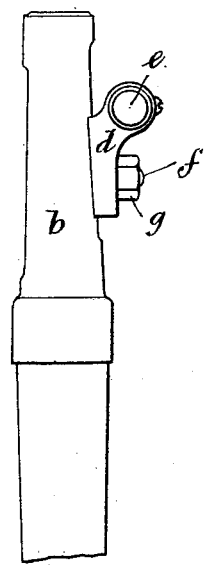
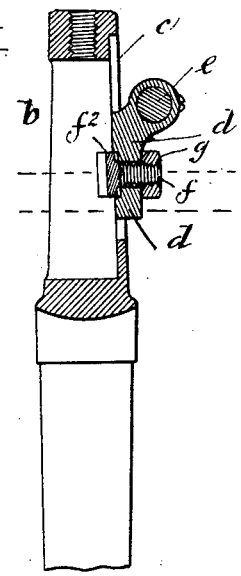
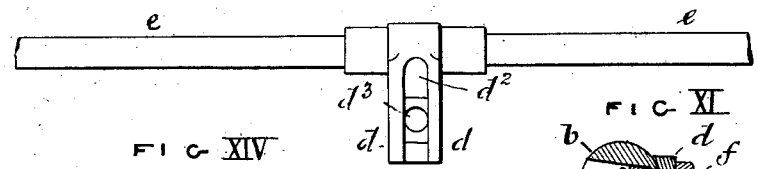
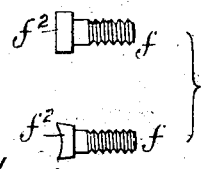
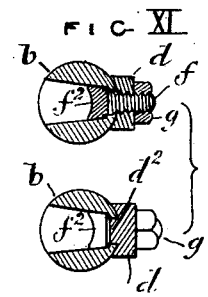
Witnesses,
George Shaw
Richard Merrett
Inventor
George Illston
N. PETERS, Photo-Lithographer, Washington, D. C.

UNITED STATES PATENT OFFICE.

GEORGE ILLSTON, OF BIRMINGHAM, COUNTY OF WARWICK, ENGLAND.

BICYCLE.

SPECIFICATION forming part of Letters Patent No. 245,071, dated August 2, 1881.

Application filed July 5, 1881. (No model.) Patented in England November 12, 1879.

*To all whom it may concern:*

Be it known that I, GEORGE ILLSTON, a subject of the Queen of Great Britain, residing at Birmingham, in the county of Warwick, England, manufacturer, have invented certain new and useful Improvements in Bicycles and Tricycles, (for which I have received Letters Patent in England, No. 4,606, dated November 12, 1879,) of which the following is a specification.

My invention consists in constructing the heads of bicycles and tricycles in the manner hereinafter described, whereby the vertical height of the handle on the head may be adjusted with great nicety, so as to suit the person using the bicycle or tricycle, and the handle of the bicycle or tricycle readily removed from and attached to the head. On one face of the head I make a vertical dovetail or grooved seat, on or in which a slide works, the said slide being fixed in any position on the said seat by means of a set-screw. In the upper part of the said slide the handle-bar is secured. The handle-bar may either be permanently fixed to the said slide or be capable of detachment therefrom.

When it is required to adjust the height of the handle on the head it is only necessary to slacken the set-screw of the slide, when the said slide carrying the handle-bar may be raised or lowered on its seat and refixed in its adjusted position by driving home the set-screw.

Instead of the dovetail or grooved arrangement described the following arrangement may be employed for adjusting the height of the handle of the bicycle or tricycle: In the face of the head of the bicycle or tricycle I make a vertical slot, in which a sliding socket works. This sliding socket carries the handle-bar, and is fixed at the required height by a screw-bolt and nut.

I will now proceed to describe, with reference to the accompanying drawings, the manner in which my invention is to be performed.

Figure I represents in front elevation, Fig. II in side elevation, Fig. III in vertical section, Fig. IV in side elevation, partly in section, and Fig. V in plan, an adjustable head of a bicycle or tricycle constructed according to my invention. Fig. VI is a cross-section of the same taken on the line $ff$, Fig. III; and Fig. VII represents the dovetail slide and seat on the head detached.

The same letters of reference indicate the same parts in Figs. I, II, III, IV, V, VI, and VII.

$b$ is the head of the bicycle or tricycle; and $g$ is the vertical dovetail seat on one face of the said head. The seat $g$ may either be made in one piece with the said head or connected thereto by screwing or otherwise. On the seat $g$ a dovetail slide, $h$, works, the said slide carrying at its upper part the socket $i$, for connecting the handle-bar $k$ to the said slide; or the handle-bar $k$ may be connected to the slide $h$ in any other convenient way. The said slide $h$ carries a set-screw, $l$, for fixing the slide and handle-bar in any position on the seat $g$. In Figs. I, II, and III the slide $h$ is represented fixed near the top of the seat $g$, and in Fig. IV near the bottom of the said seat.

When it is required to adjust the vertical height of the handle on the head $b$ it is only necessary to slacken the set-screw $l$, when the slide $h$ is released, and may be raised or lowered on its seat and refixed in its adjusted position by driving home the set-screw $l$, as represented. The slide carrying the handle-bar and the seat on the head may have a figure other than the dovetail figure represented. By slackening the set-screw $l$ to the required extent the slide $h$ may be wholly withdrawn from the seat $g$ on the head $b$, carrying with it the handle $k$. The handle is thus detachable from the bicycle or tricycle head at the pleasure of the user.

Figs. VIII, IX, X, XI, XII, XIII, and XIV represent an adjustable head, constructed according to my invention, in which the sliding socket carrying the handle-bar works in a vertical slot made in the face of the head. Fig. VIII represents a front elevation of the adjustable head; Fig. IX, a side elevation; Fig. X, a vertical section, and Fig. XI horizontal section. Fig. XII represents the inner face of the sliding socket detached, and Fig. XIII is a horizontal section of the same. Fig. XIV represents the screw-bolt detached.

$b$ is the head, and $c$ is the vertical slot made in its face.

$d$ $d^2$ is the sliding socket carrying the handle-bar $e\ e$. Along the middle of the inner face of the sliding socket is a rib, $d^2$, of a size and shape proper to work closely in the vertical slot $c$, the parts $d\ d$ on either side the middle rib, $d^2$, bearing against the outer face of the head $b$. The shape of the sliding socket $d\ d^2$ is best seen in Figs. XII and XIII, and the manner in which the rib part $d^2$ works in the vertical slot $c$ is best seen in the horizontal section Fig. XI.

$f$ is the screw-bolt for fixing the sliding socket $d\ d^2$ in its adjusted position. The head $f^2$ of the screw-bolt $f$ has inclined sides, which bear against the inner face of the hollow head $b$. The screwed stem $f$ of the bolt is passed from the back of the head $b$ through the hole $d^3$ in the sliding socket $d$, and a screw-nut, $g$, is screwed upon the said stem. After the height of the sliding socket $d\ d^2$ has been adjusted in the slot $c$ the screw-nut $g$ is screwed home, so as to cause the said socket to be griped firmly between the head $f^2$ of the screw-bolt and the nut $g$, as seen in Fig. XI, and thereby fix the socket and handle-bar in their adjusted position. By partly unscrewing the nut $g$ the gripe upon the sliding socket is relaxed, and the latter may be raised or lowered in the slot $c$, and again fixed by screwing home the said nut $g$. Or, by wholly removing the screw-nut $g$ from the screw $f$ the sliding socket $h$ may be withdrawn from the slot $c$ in the head, carrying with it the handle $e$, the parts thus constituting a detachable handle.

Having now described the nature of my invention and the manner in which the same is to be performed, I wish it to be understood that I claim as my invention of improvements in bicycles and tricycles—

1. The improvements in constructing the heads of bicycles and tricycles hereinbefore described and illustrated in Figs. I, II, III, IV, V, VI, and VII of the accompanying drawings, for the purpose of readily adjusting the vertical height of the handles on the said heads and rendering the handles detachable from the heads—that is to say, making on the face of the head a dovetail or grooved seat, on or in which a slide carrying the handle-bar works, the said slide being adjusted at any desired height on the said seat, and fixed in its adjusted position by means of a set-screw or other equivalent arrangement, substantially as described and illustrated.

2. The modification described and illustrated in Figs. VIII, IX, X, XI, XII, XIII, and XIV, in which a vertical slot is made in the face of the head, in which slot a socket carrying the handle slides, and is fixed by a screw-bolt and nut, or other equivalent arrangement, as described and illustrated.

GEORGE ILLSTON. [L. S.]

Witnesses:
 GEORGE SHAW,
 RICHARD SKERRETT,
 *Both of No. 37 Temple Street, Birmingham.*